US008833831B2

(12) United States Patent
Manzke, Jr.

(10) Patent No.: US 8,833,831 B2
(45) Date of Patent: Sep. 16, 2014

(54) BARRIER SYSTEM FOR PROTECTING BUS DRIVERS

(71) Applicant: G. William Manzke, Jr., Dublin, OH (US)

(72) Inventor: G. William Manzke, Jr., Dublin, OH (US)

(73) Assignee: Nabi Bus, LLC, Anniston, AL (US)

( * ) Notice: Subject to any disclaimer, the term of this patent is extended or adjusted under 35 U.S.C. 154(b) by 0 days.

(21) Appl. No.: 13/754,598

(22) Filed: Jan. 30, 2013

(65) Prior Publication Data

US 2014/0210225 A1      Jul. 31, 2014

(51) Int. Cl.
*B60N 2/44*      (2006.01)
*B60J 1/02*      (2006.01)
*B60R 21/12*     (2006.01)

(52) U.S. Cl.
CPC ....................................... *B60R 21/12* (2013.01)
USPC .......................................... 296/24.4; 296/178

(58) Field of Classification Search
CPC .......... B60R 5/04; B60R 5/047; B60R 5/045; B60R 5/041; B60R 5/044; B60R 5/00; B60R 5/042; B60R 5/048; B60R 21/026; B60R 21/06; B60R 21/02; B60R 21/055; B60R 21/12; B60R 21/13; B60R 21/232; B60R 2021/0083; B60R 2021/0266; B60R 2021/065; B60R 2021/161; B60N 2/36; B60N 2/305; B60N 2/3011; B60N 2/24; B60N 2/3031; B60N 2/3018; B60N 2/3056; B60N 2/3065; B60N 2/309; B60N 2/686; B60N 2/01508; B60N 2/06; B60N 2/0825; B60N 2/44; B60N 2/441
USPC ................ 296/24.4, 178, 179, 190.08, 24.46, 296/24.43, 24.35, 24.3, 24.37, 24.36, 24.1, 296/24.6, 24.31, 24.42; 109/9
See application file for complete search history.

(56) References Cited

U.S. PATENT DOCUMENTS 4,227,735 A * 10/1980 Joyner ........................ 296/24.46

FOREIGN PATENT DOCUMENTS

EP            2428411 A1 *    3/2012

* cited by examiner

*Primary Examiner* — Joseph D Pape
*Assistant Examiner* — Dana Ivey
(74) *Attorney, Agent, or Firm* — C. Brandon Browning; Maynard, Cooper & Gale, PC (57) ABSTRACT

A barrier apparatus for protecting a bus driver including a vertically-oriented panel selectively moveable along a set of tracks between a forward position and a rearward position within a bus, the forward position including the panel positioned between a driver's seat and a passenger entryway of the bus. The panel is arranged so that, when in the forward position or the rearward position or moved between the forward position and the rearward position, the panel remains on a driver's side of the bus thus ensuring that the panel does not obstruct passenger traffic into and out of the bus during any phase of operation of the barrier system.

40 Claims, 10 Drawing Sheets

BARRIER SYSTEM FOR PROTECTING BUS DRIVERS

FIELD OF INVENTION

The present invention relates to a barrier for protecting a bus driver, and more particularly, to a slidable or rollable barrier arranged for preventing passengers from physically interfering with or successfully directing projectiles at a bus driver.

BACKGROUND OF INVENTION

Barriers for protecting drivers are known in the art. U.S. Pat. No. 4,227,735 discloses an enclosure about the driver of a typical mass transit bus. The driver's location is surrounded by a rear wall with transparent windows therein and a side wall also with transparent windows therein. U.S. Pat. No. 5,004,286 discloses a compartment for the bus driver having transparent, multi-layered, bullet-proof paneling. All of the paneling is vertically oriented. U.S. Pat. No. 7,032,946 discloses a barrier shield having selective transparent areas therein that incorporates particular optical glare and reflection reduction methods utilizing diffractive and grating techniques within a slanted insert having selective openings therethrough. The barrier shield is mounted within the closure door enabling the driver/operator to view the passengers through the closure door barrier shield using, typically, the inside rear-view mirror without compromise to safety or security. U.S. Pat. No. 3,369,836 discloses a removable protective shield for use with motorcycles wherein an accessory shield is securable to the exterior surface of the motorcycle shield for protection of an individual during use of the motorcycle. U.S. Pat. No. 4,412,495 discloses a body shield made of bullet-proof type material for support by an individual provided with a window portion within the shield. U.S. Pat. No. 3,866,242 discloses a protective shield in the contour of a clip board, windshield for a vehicle, and a face shield for a helmet to be utilized by an individual for protection thereof. U.S. Pat. No. 3,855,898 discloses a protective panel construction for windows of a self-propelled vehicle including fabric strap members and the like for securement of the panels to a windshield. U.S. Pat. No. 2,566,032 discloses a vertical screen which is mounted between the driver and the passenger. The screen is operated by a foot pedal which allows the driver to move the screen upwardly when desired. U.S. Pat, No. 3,469,090 discloses a bullet-proof partition incorporating a money transfer opening. U.S. Pat. No. 3,549,195 discloses still another type of protective device or enclosure for the driver of a taxicab; which compartment consists of a glass partition and includes electric locking means coupled to the passenger doors.

SUMMARY OF THE INVENTION

The present invention is directed to a barrier system for use in busses. The purpose of the barrier system is to protect bus drivers from projectiles which may originate from outside of the bus when bus doors are open or from passengers located inside of the bus vestibule. The barrier system accomplishes this purpose without obstructing passenger movement through the vestibule or along the passenger aisle of the bus. The barrier system also does not obstruct a driver's vision of the exterior mirrors located on the passenger entryway side of the bus.

According to one aspect of the invention, there is provided a barrier apparatus including a vertically-oriented panel selectively moveable between a forward position and a rearward position within a motor vehicle, the forward position including the panel positioned between a driver's seat and a passenger entryway of the motor vehicle. The panel is arranged so that, when in the forward position or the rearward position or moved between the forward position and the rearward position, the panel remains on a driver's side of the motor vehicle. This ensures that the panel does not obstruct passenger traffic into and out of the bus during any phase of operation of the barrier system. Thus, unlike conventional barrier systems, the panel does not swing around an axis between a first position and a second position and in so doing obstruct passenger traffic. Rather the panel, in its entirety, is moved fore and aft by sliding, rolling or the like.

To ensure that a bus driver is protected, the panel has an upper edge located at least two feet to four feet above a topmost surface of a back of the driver's seat and a lower edge located at or below a level of a bottommost surface of the driver's seat. When in the forward position, a back edge of the panel extends a short distance beyond the driver's seat. The forward edge of the panel has a rearwardly extending portion which forms an indentation in a forward portion of the panel, the indentation being positioned in an upper half of the panel. The indentation ensures that the bus driver's vision of the exterior mirrors located on the opposite side of the bus remains unobstructed while providing maximum protection for the driver.

To guide the fore and aft movement of the panel, a bottom of the panel is engaged with a lower track and a top of the panel is engaged with an upper track. Each of the lower track and the upper track includes a rearward section extending fore and aft and a forward section oriented at an angle relative to the rearward section. The bottom of the panel includes at least two pins that extend downwardly into a channel defined by the lower track. The pins interact with the channel to guide movement of the panel. Preferably, the lower track is coupled to a vertical face of a driver's seat platform. The upper track includes a rearward section coupled to a barrier wall structure protecting the back of the driver and a disjointed forward section that extends from the rear section to a bracket that attaches the forward section to the underside of a destination display box of the bus. The top of the panel interacts with the upper track via a set of trolleys. The trolleys include sets of beveled wheels that roll along a V-shaped channel defined by the upper track. The upper track carries the full weight of the panel.

According to another aspect of the invention, there is provided a barrier system for protecting a bus driver including a track system extending substantially fore and aft within a bus and between a driver's compartment portion and a passenger entryway of the bus. A panel is supported by the track system that is movable between a forward position and a rearward position. The bus passenger aisle is located between the passenger entryway and the panel when the panel is in the forward position, the rearward position and moved there between thus ensuring no obstruction of traffic through the bus by the barrier system. The track system includes an upper track and a lower track with the lower track being supported above an aisle floor of the bus.

According to another aspect of the invention, there is provided a barrier system including an upper track coupled to a wall structure located immediately behind a driver's seat, a lower track coupled to a driver's seat platform, and a panel supported between the upper track and the lower track and movable fore and aft within the bus and between a driver's seat and passenger entryway of the bus. A trolley mechanism is pivotably engaged between the upper track and the panel.

DETAILED DESCRIPTION OF THE DRAWINGS

Figure 1:
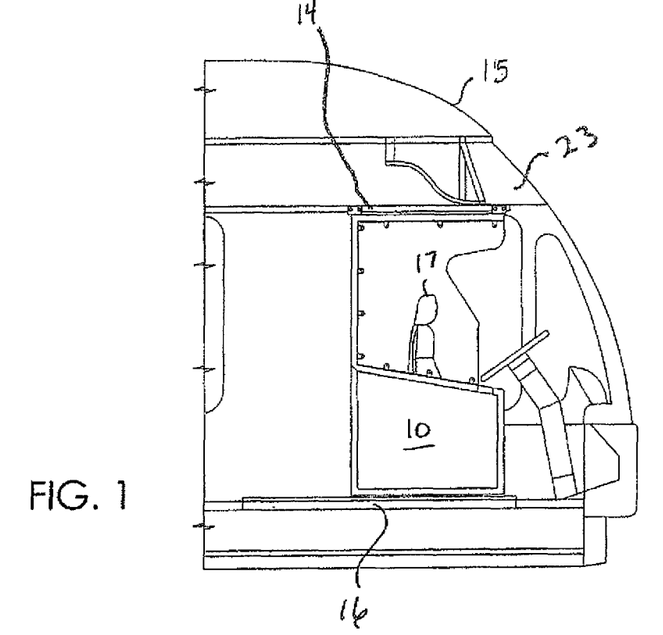
FIG. 1 is an elevational view of a bus barrier door arranged in a forward position within a bus in accordance with a preferred embodiment of the present invention.
Figure 2:
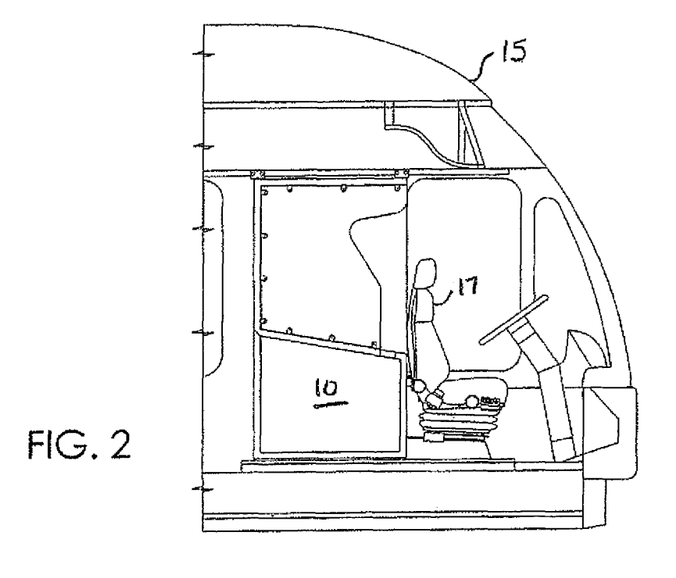
FIG. 2 is an elevational view of the bus barrier system of FIG. 1 arranged in a rearward position.
Figure 3:
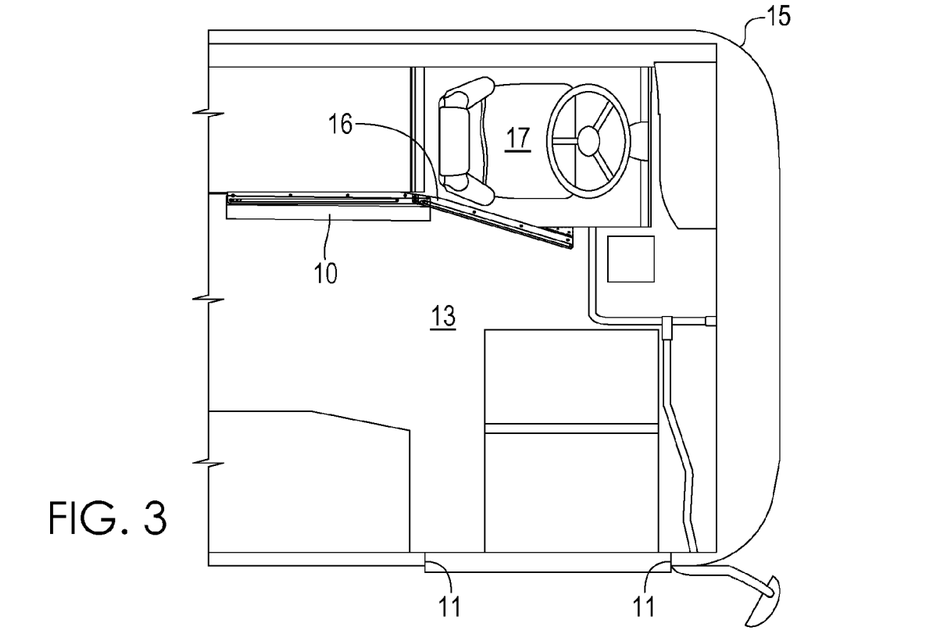
FIG. 3 is a top plan view of the bus barrier door of FIG. 2 engaged with a lower track assembly.
Figure 4:
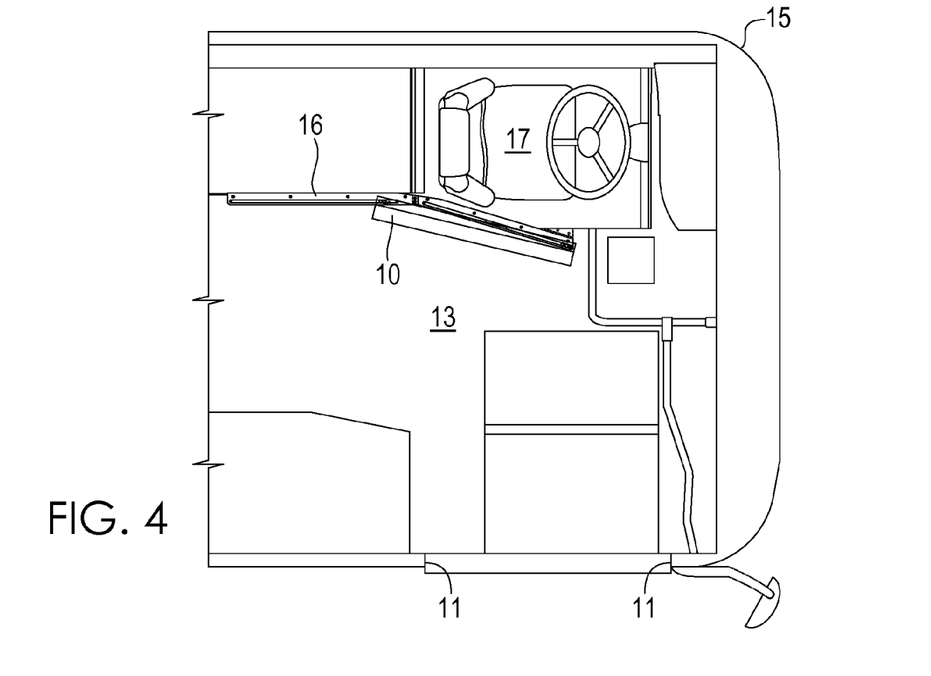
FIG. 4 is a top plan view of the bus barrier door of FIG. 1 engaged with a lower track assembly.
Figure 5:
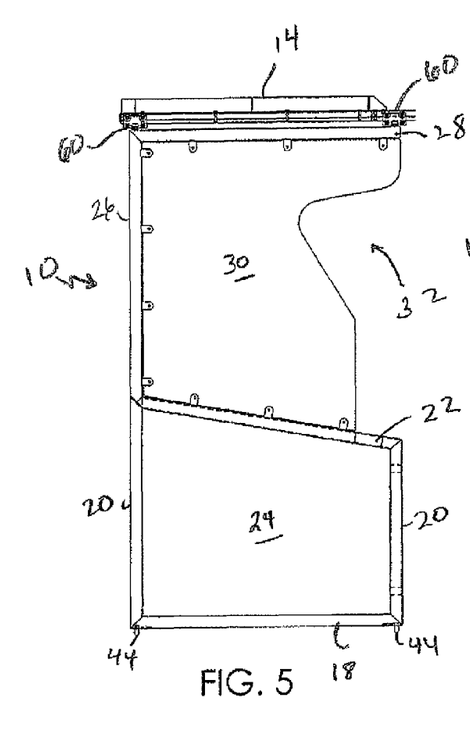
FIG. 5 is an elevational view of a first side of the bus barrier door of FIG. 1 engaged with an upper track assembly section.
Figure 6:
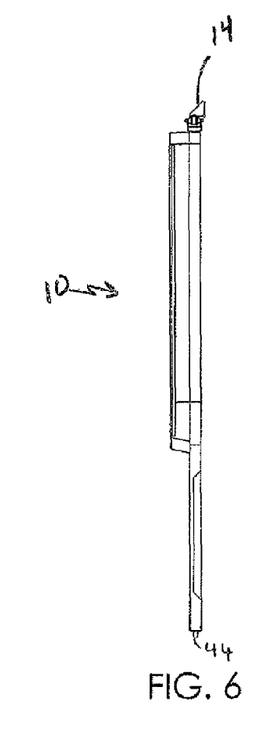
FIG. 6 is an elevational view of a forward edge of the bus barrier door and upper track assembly section of FIG. 5.
Figure 7:
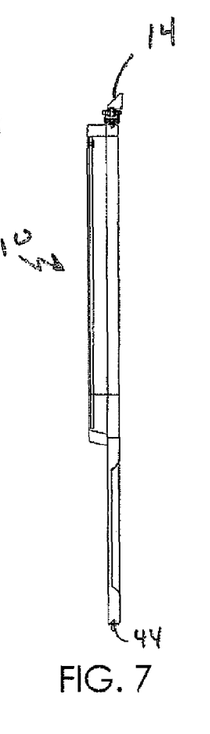
FIG. 7 is an elevational view of a forward edge of the bus barrier door and upper track assembly section of FIG. 5.
Figure 8:
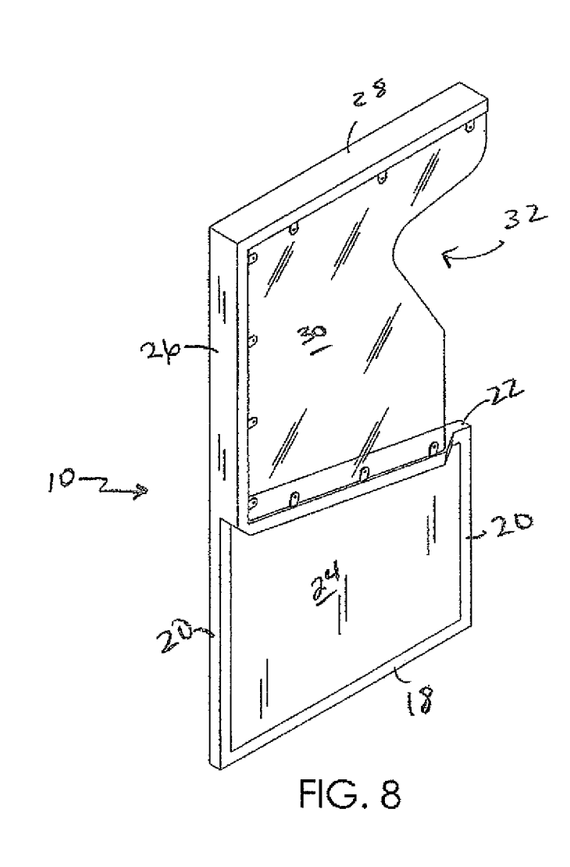
FIG. 8 is a rear perspective view of a first side of the bus barrier door of FIG. 1.
Figure 9:
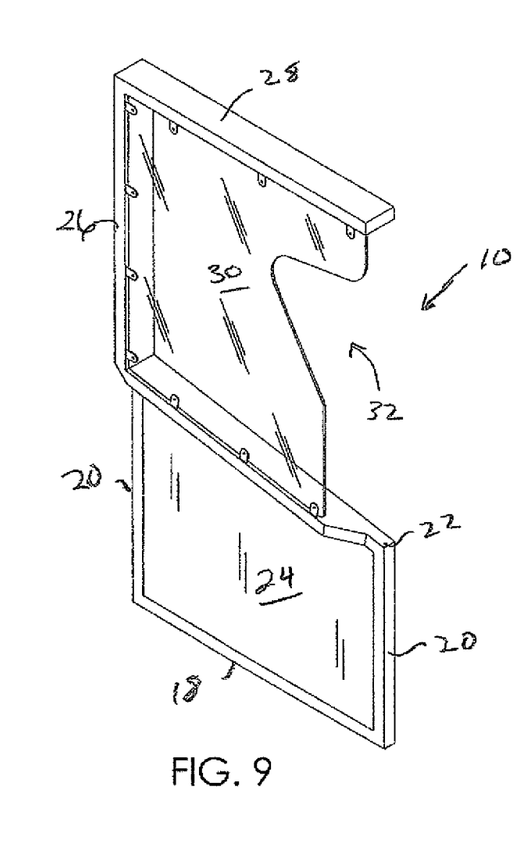
FIG. 9 is a front perspective view of the first side a bus barrier door of FIG. 1.
Figure 10:
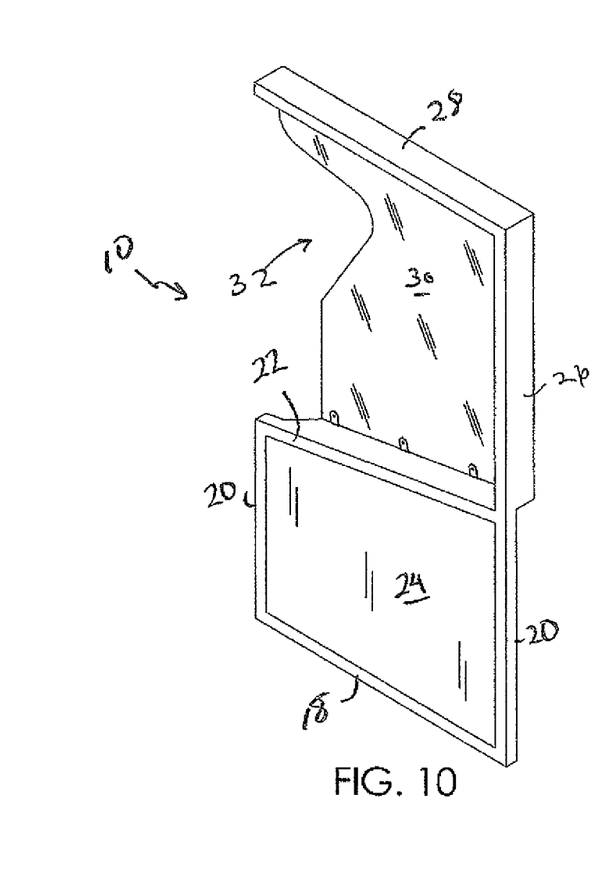
FIG. 10 is a rear perspective view of a second side of the bus barrier door of FIG. 1.
Figure 11:
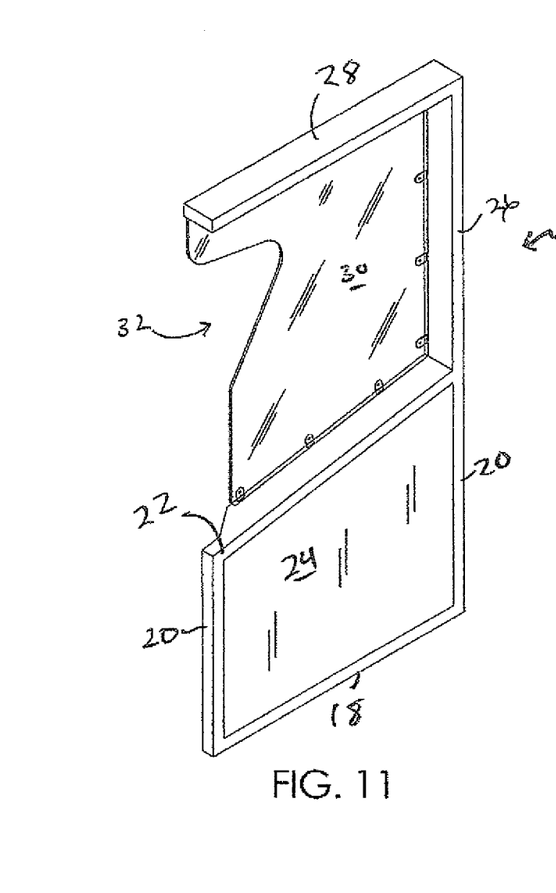
FIG. 11 is a front perspective view of the second side a bus barrier door of FIG. 1.
Figure 12:
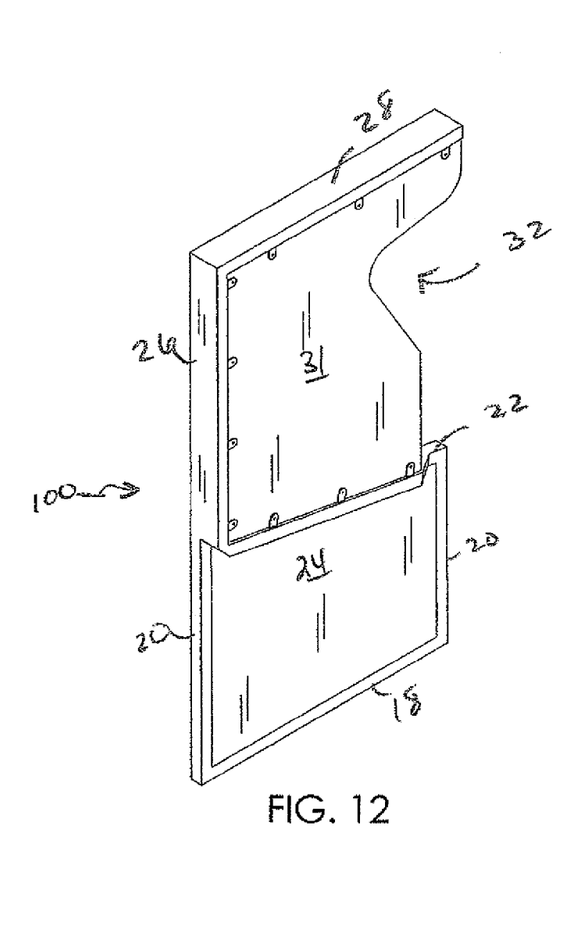
FIG. 12 is a rear perspective view of a first side of a bus barrier door having an opaque upper panel in accordance with a preferred embodiment of the present invention.
Figure 13:
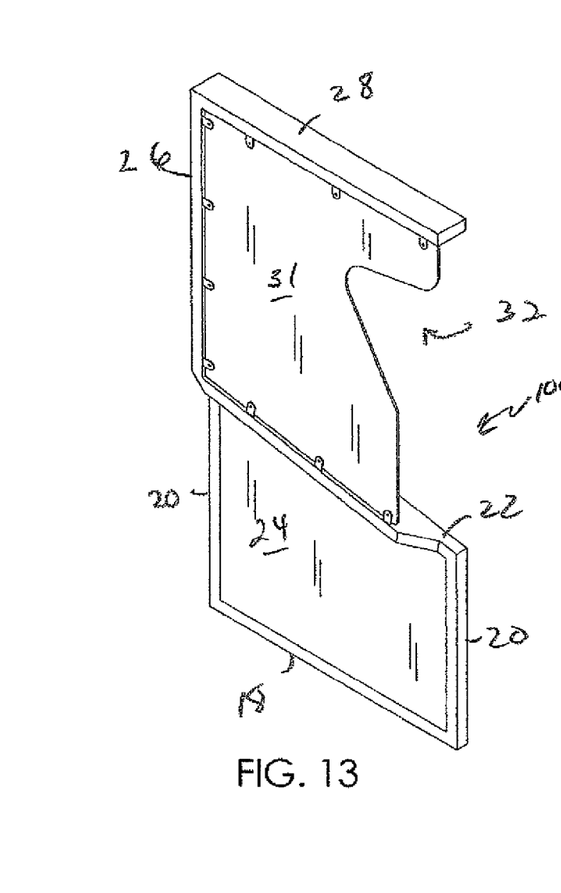
FIG. 13 is a front perspective view of the first side of the bus barrier door of FIG. 12.
Figure 14:
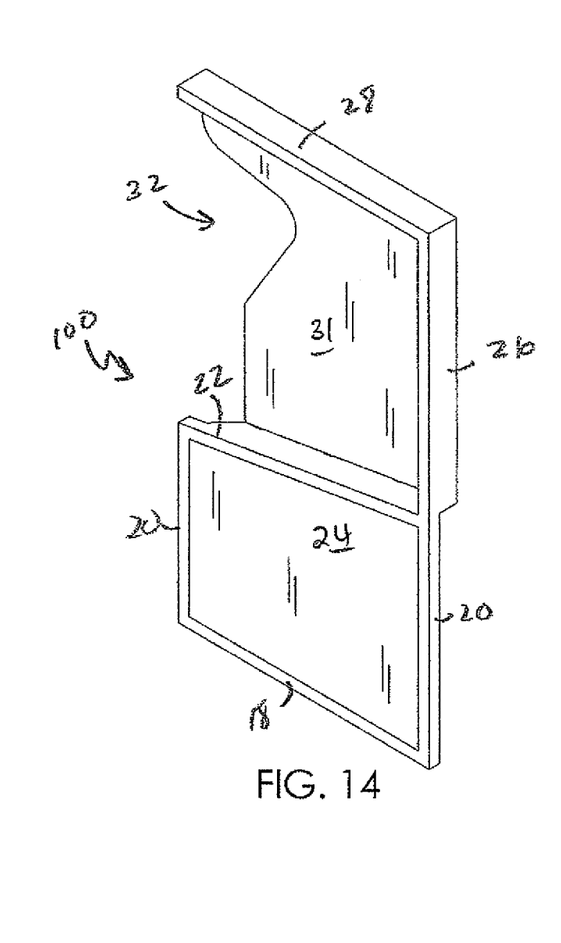
FIG. 14 is a rear perspective view of a second side of the bus barrier door of FIG. 12.
Figure 15:
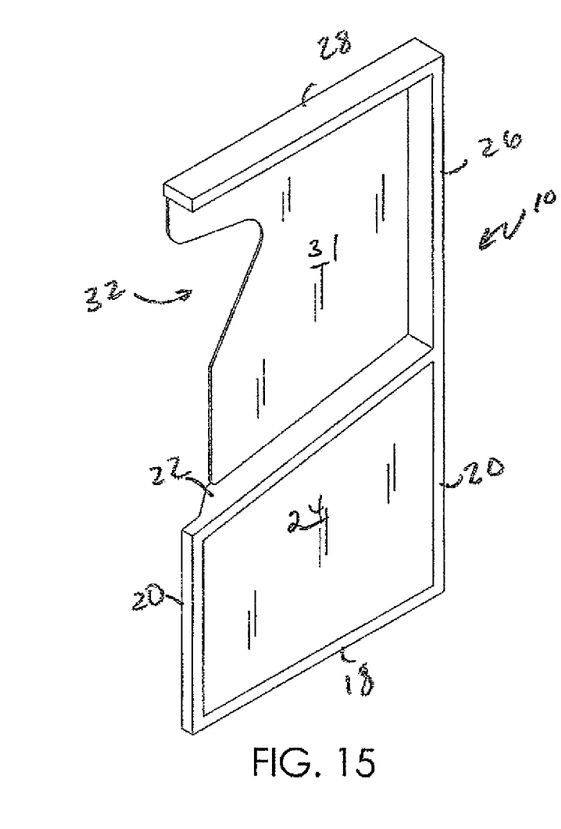
FIG. 15 is a front perspective view of the second side of the bus barrier door of FIG. 12.

Referring to FIGS. 1 through 4, the present invention is directed to a bus barrier door system for protecting a bus driver from projectiles launched through a passenger doorway 11 or from a vestibule 13 of a bus 15. The barrier system includes a rigid, vertically-oriented panel 10 arranged within vestibule 13 on a driver's side of bus 15. Panel 10 is selectively moveable between a forward position as depicted in FIG. 1 and a rearward position as depicted in FIG. 2. This accomplished by supporting panel 10 between an upper track assembly 14 and a lower track assembly 16 which extend substantially fore and aft in bus 15 and above and below driver's seat 17.

To ensure the safety of the bus driver, panel 10 has an upper edge that is positioned at least 2 to 4 feet above a topmost surface of driver's seat 17 and a lower edge positioned at or below a level of a bottommost surface of driver's seat 17. In the embodiment depicted in FIGS. 1 and 2, panel 10 is arranged within bus 17 in a manner that prevents projectile being directed over or under panel 10 when it is in the forward position. When in the forward position, a back edge of panel 1 extends beyond the back edge of driver's seat 17 and a forward edge of panel 10 extends to be adjacent to a front edge of driver's seat 17. At all times during its operation, panel 10 is positioned immediately adjacent to or behind a driver's seat 17. In this manner, panel 10 does not interfere with the flow of pedestrian traffic into and out of bus 15 since at no time does panel 10 project out into the aisle.

Referring to FIGS. 5 through 11, panel 10 is composed of a frame having a lower frame section and an upper frame section. The lower frame section include a horizontal lower member 18 and a pair of opposing vertical members 20 coupled to respective ends of the lower member at rights angles. An upper member 22 extends between the top ends of vertical members 20. Upper member 22 is arranged to slope downward between vertical members 20 from a rear edge of panel 10 to a front edge of panel 10. In the space defined by the lower frame, an opaque lower panel 24 is provided which serves to protect the bus drivers from projectile directed at the driver's legs and lower torso.

The upper frame is supported on top of the lower frame and is composed of an upright rear member 26 and an upper horizontal member 28. In the space defined between rear member 26, horizontal member 28 and upper member 22, a translucent upper panel 30 is provided which serves to protect the bus driver from projectiles directed at the bus driver's head and upper torso. Upper panel 30 is coupled to an aisle edge or side of rear member 26, horizontal member 28 and upper member 22 such that the topside of upper member 22 forms a rest upon which a driver can place his arm. To ensure that the driver's view of its passenger side mirrors is unobstructed by upper panel 30, the front edge of upper panel 30 include a notch 32. Notch 32 is arranged to provide a clear line of sight between the bus driver and the passenger side mirrors of bus 15. In the preferred embodiment, notch 32 has a depth of about 12 inches.

Referring to FIGS. 12 through 15, there is depicted an alternative panel 100 for use in the bus barrier system of the present invention. Panel 10 and panel 100 are identical except that upper panel 30 of panel 10 is transparent. Panel 100, on the other hand, includes an opaque upper panel 31.

Figure 17:
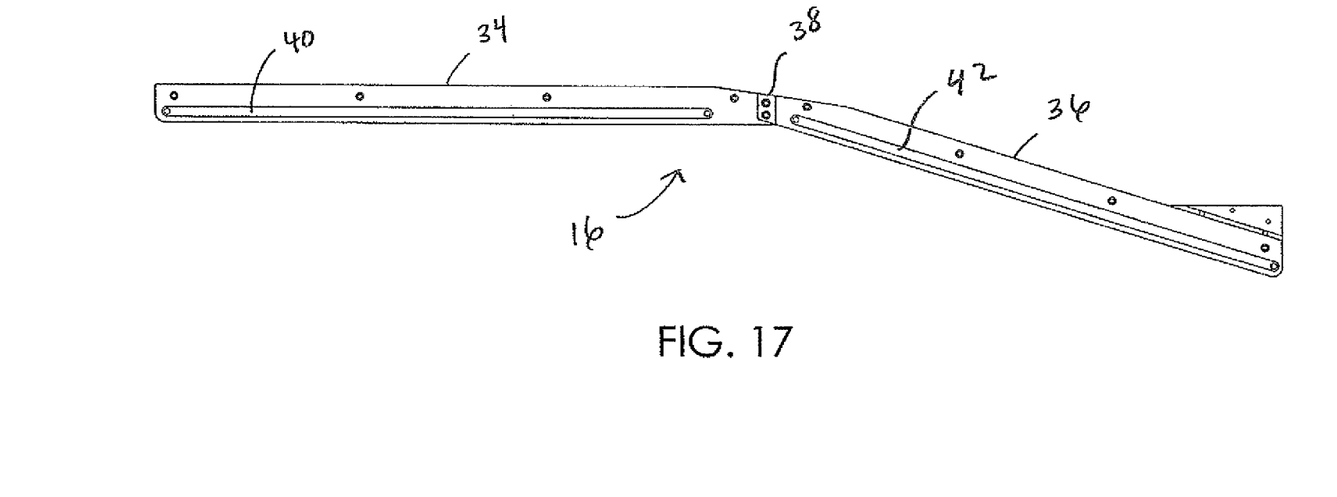
FIG. 17 is a top plan view of a lower track assembly in accordance with a preferred embodiment of the present invention.
Figure 19:
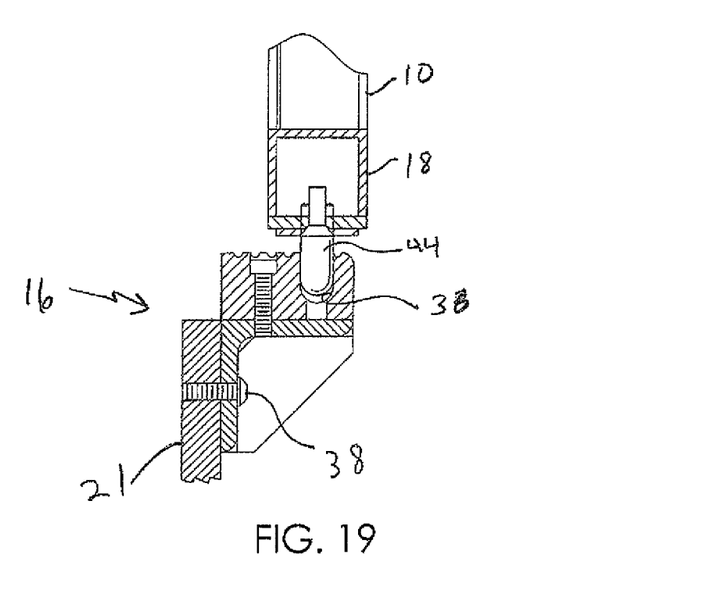
FIG. 19 is a schematic diagram of a pin mechanism of the bus barrier door of FIG. 1 engaged with the lower track assembly of FIG. 17.
Figure 21:
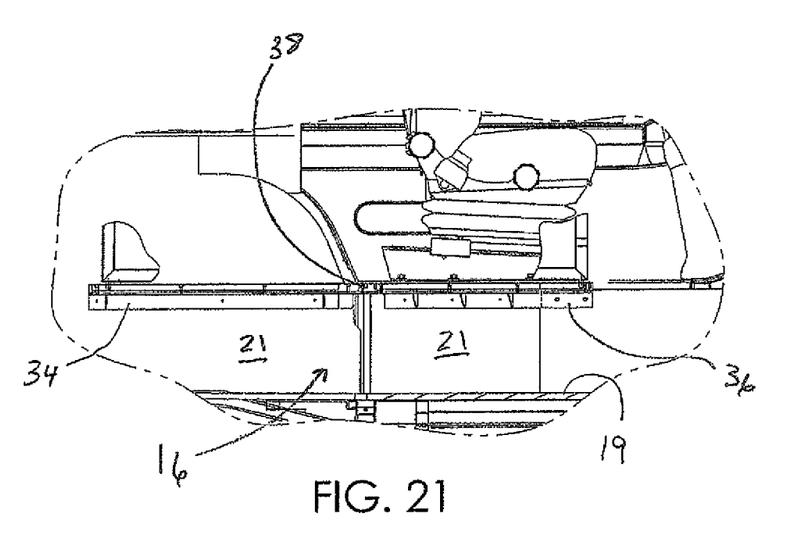
FIG. 21 is an elevational view of the bus barrier door of FIG. 1 showing the lower track assembly coupled to a bus driver seat platform.

Movement of the panel 10 from the forward to the rearward position is guided by the interaction of the bottom of panel 10 with lower track assembly 16 and a top of panel 10 with upper track assembly 14. Referring to FIGS. 17, 19 and 21, lower track assembly 16 extends substantially fore and aft above an aisle floor 19 of bus 15 and is coupled to a vertical face 21 of the driver's seat platform. Lower track assembly 16 includes a rearward section 36 extending fore and aft and a forward section 36 coupled at an angle relative to rearward section 34 at joint 38. In particular, rearward section 34 is coupled to a wall structure that is located behind driver's seat 17 and contiguous with the driver's seat platform and extends substantially parallel to a longitudinal axis of the bus. Forward section 34 is coupled directly below driver's seat 17 and extends from joint 38 toward the longitudinal axis of bus 15. The angle of forward section 21 makes room for bus driver's seat 17. As depicted in FIG. 19, lower track assembly is coupled to the wall structure and platform by bolts 38

Referring to FIG. 17, rearward section 34 contains a channel 40, and forward section includes a channel 42. Channels 40 and 42 are formed in the upper face of lower track assembly 16 and are arranged to slidably engage, receive and guide a set of pins 44 projecting from the bottom of panel 10. When moved between the forward position and the rearward position, the rear pin of set of pins 44 travels along channel 34 and the forward pin travels along channel 42. Channels 40 and 42 do not carry the weight of panel 10 but only serve to guide the movement of panel 10 fore and aft. Since foreword and rearward sections 34 and 36 are not aligned, when panel 10 is slid along channels 34 and 36, panel 10 is caused to rotate about set of pins 44. For example, as panel 10 is slid forward, the front edge of the panel moves toward the longitudinal axis of the bus. As this occurs the rear portion of panel 10 is caused to pivot about the rear pin of set of pins 44. Thus, each of pins 44 serves as a vertically arranged pivot axis about which panel 10 rotates when slid between the forward and rearward positions.

Figure 16:
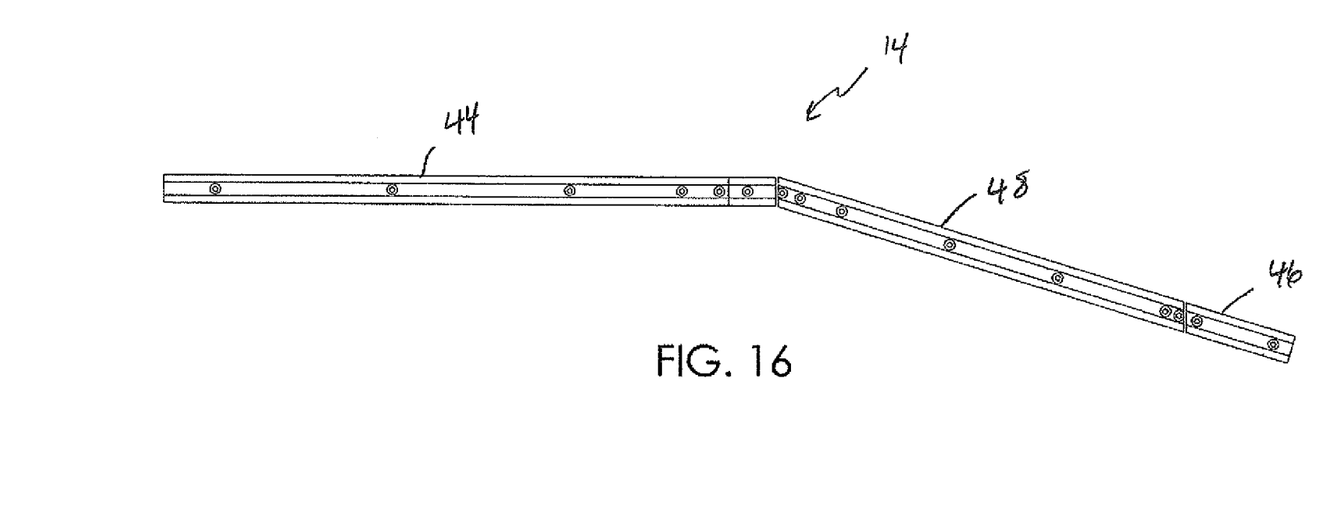
FIG. 16 is a bottom plan view of an upper track assembly in accordance with a preferred embodiment of the present invention.
Figure 18:
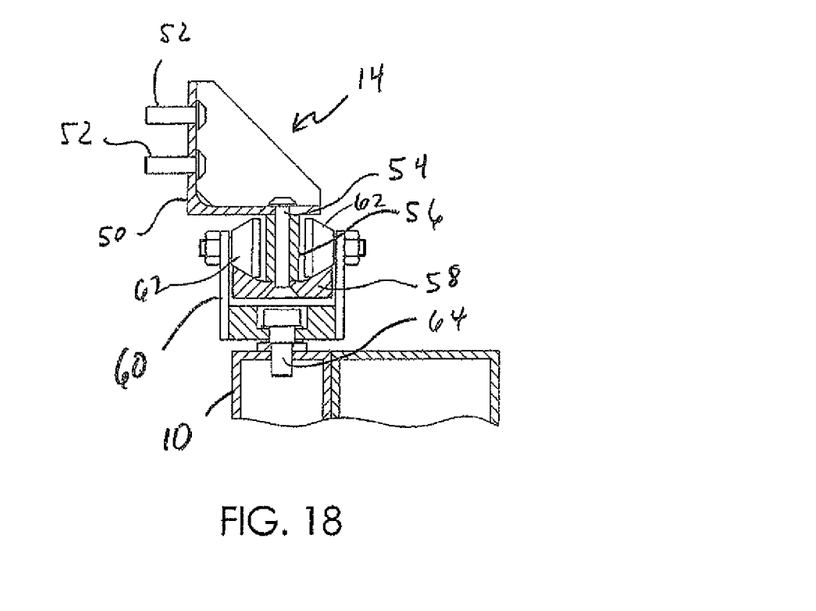
FIG. 18 is a schematic diagram of a trolley mechanism of the bus barrier door of FIG. 1 engaged with the upper track assembly of FIG. 16.
Figure 20:
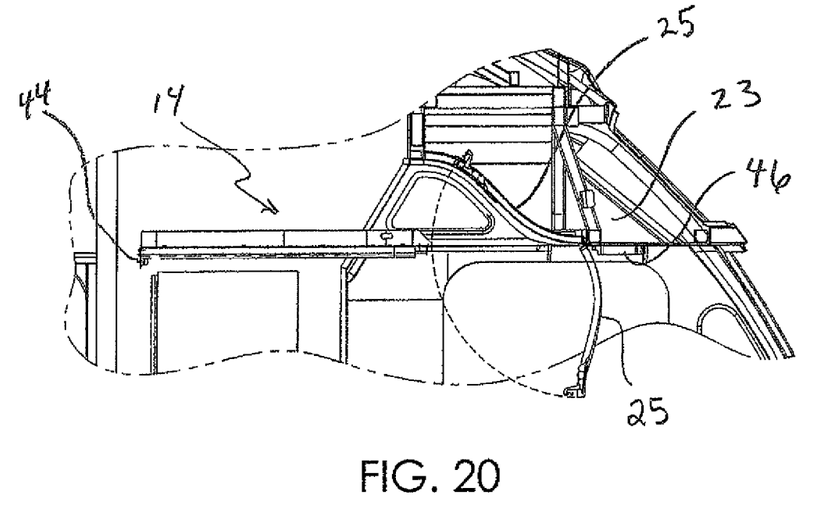
FIG. 20 is an elevational view of the bus barrier door of FIG. 1 showing a section of the upper track assembly removed to allow access to a bus signage compartment.

The weight of panel 10 is carried by upper track assembly 14. Referring to FIGS. 16, 18 and 20, upper track assembly 14 is composed of three sections including a rear section 44, a forward section 46 and a middle section 48, which is coupled between sections 44 and 46. Rear section 44 extends fore and aft within bus 15 and is coupled to a vertical face of a wall located behind and above driver's seat 17. As depicted in FIG. 18, an L-shaped bracket 50 connects rear section 44 to the wall using bolts 52. A plurality of connectors 54, extending vertically through a central wall 56 of rear section 44, couples bracket 50 to rear section 44. Connector 54 further extends through a base portion 58 of rear section 44 thereby coupling the base portion to central wall 56 with the central wall dividing base portion 58 into right and left halves. Each of right and left halves define a channel including a floor which slopes downward toward central wall 56 before extending horizontally toward central wall 56. In combination, central wall 56 and base portion 58 form the track portion of rear section 44.

Forward section 46 is located apart from rear section 44 and coupled to an underside of a bus signage compartment 23, where bus destination notices are positioned. The rear edge of forward section 46 terminates immediately before the opening of compartment 23. Middle section 48 is removably coupled to and between a front end of rear section 44 and a rear end of forward section 46. Middle section 48 is positioned at an angle to rear section 44 and is axially aligned with forward section 46 to allow the front portion of upper track assembly 14 to mirror the front portion of lower track assembly 16. As depicted in FIG. 20, when it is desired to access compartment 23, middle section 48 can be removed allowing a door 25 of compartment 23 to swing downward thereby providing access without having to remove the entire upper track assembly 14. Like rear section 44, middle and forward sections 48 and 46 include channels defined by a central wall dividing a base portion into right and left halves having floors which slope downward toward the central wall before extending horizontally toward the central wall.

The top of the panel 10 engages with upper track assembly 14 by a pair of trolleys 60. Referring to FIG. 18, each trolley 14 includes a pair of opposed, beveled wheels 62 which are received into the right and left respective sides of the channels of rear, middle and forward sections 44, 46 and 48 of upper track assembly 14. The interaction of the beveled wheels 62 of trolleys 60 with the sloped floors of base portions 58 of upper track assembly 14 provide a steady base upon which to carry the weight of the panel 10. A pivot pin 64 couples panel 10 to trolleys 60 to allow panel 10 to pivot thereabout when slid between forward and rearward positions.

In combination with upper and lower track assemblies 14 and 16, panel 10 is arranged so that, when in either the forward or the rearward position or moved between said positions, the panel remains on the driver's side of the motor vehicle. This ensures that the panel does not obstruct passenger traffic in the bus vestibule where passengers enter and exit the vehicle or in the passenger aisle. Thus, unlike conventional barrier systems, the panel does not swing around a single axis between a first position and a second position and in so doing obstruct passenger traffic. Rather, panel 10 is moved between the forward and rearward position by sliding, rolling or the like.

As will be apparent to one skilled in the art, various modifications can be made within the scope of the aforesaid description. Such modifications being within the ability of one skilled in the art form a part of the present invention and are embraced by the claims below.

It is claimed:

1. A barrier apparatus comprising:
a vertically-oriented panel selectively moveable between a forward position and a rearward position within a motor vehicle, the forward position including the vertically-oriented panel positioned between a driver's seat and a passenger entryway of the motor vehicle for intercepting projectiles travelling through the passenger entryway towards an occupant of the driver's seat and the rearward position including the vertically-oriented panel positioned essentially aft of the forward position,
wherein, when in the forward position, the vertically-oriented panel does not intersect a line of sight extending through the passenger entryway and to and between the occupant of the driver's seat and a side view mirror extending outwardly from an exterior surface portion of the motor vehicle located on a passenger entryway side of the motor vehicle.

2. The barrier apparatus according to claim 1 wherein the vertically-oriented panel is slidably coupled to the motor vehicle.

3. The barrier apparatus according to claim 1 wherein the vertically-oriented panel is positioned within a vestibule of a bus.

4. The barrier apparatus according to claim 2 wherein, when in the forward position and the rearward position and moved between the forward position and the rearward position, the vertically-oriented panel remains on a driver's side of the bus.

5. The barrier apparatus according to claim 1 wherein the vertically-oriented panel includes a forward edge having a rearwardly extending edge portion that forms an indentation in the forward edge of the vertically-oriented panel, the indentation being positioned in an upper half of the forward edge of the vertically-oriented panel.

6. A barrier apparatus comprising:
a vertically-oriented panel selectively moveable between a forward position and a rearward position within a motor vehicle, the forward position including the vertically-oriented panel positioned between a driver's seat and a passenger entryway of the motor vehicle for intercepting projectiles travelling through the passenger entryway towards an occupant of the driver's seat and the rearward position including the vertically-oriented panel positioned essentially aft of the forward position,
wherein the vertically-oriented panel includes an upper edge and a lower edge, the upper edge being located at least two feet above a topmost surface of a back of the driver's seat and the lower edge being located at or below a level of a bottommost surface of the driver's seat.

7. The barrier apparatus according to claim 1 wherein the vertically-oriented panel includes two vertically arranged pivot axes.

8. The barrier apparatus according to claim 1 wherein a bottom of the vertically-oriented panel is engaged with a lower track.

9. The barrier apparatus according to claim 8 wherein the lower track includes a rearward section extending fore and aft and a forward section oriented at an angle relative to the rearward section.

10. The barrier apparatus according to claim 8 wherein the bottom of the vertically-oriented panel includes at least two pins extending downwardly into a channel defined by the lower track.

11. The barrier apparatus according to claim 8 wherein the lower track is coupled to a vertical face of a driver's seat platform.

12. The barrier apparatus according to claim 1 wherein a top of the vertically-oriented panel is engaged with an upper track.

13. The barrier apparatus according to claim 12 wherein the upper track includes a rearward section extending fore and aft and a forward section oriented at an angle relative to the rearward section.

14. The barrier apparatus according to claim 12 further comprising at least two trolley members engaged with and between the upper track and the top of the vertically-oriented panel.

15. A barrier apparatus comprising:
a vertically-oriented panel selectively moveable between a forward position and a rearward position within a motor vehicle, the forward position including the vertically-oriented panel positioned between a driver's seat and a passenger entryway of the motor vehicle for intercepting projectiles travelling through the passenger entryway towards an occupant of the driver's seat and the rearward position including the vertically-oriented panel positioned essentially aft of the forward position,
an upper track engaged with a top of the vertically-oriented panel, and
at least two trolley members engaged with and between the upper track and the top of the vertically-oriented panel,
wherein the at least two trolleys members include beveled wheels.

16. The barrier apparatus according to claim 15 wherein the upper track includes a substantially V-shaped channel for receiving the beveled wheels.

17. The barrier apparatus according to claim 12 wherein the vertically-oriented is suspended from the upper track.

18. The barrier apparatus according to claim 12 wherein the upper track includes a rearward section and a disjointed forward section.

19. A barrier apparatus comprising:
a vertically-oriented panel selectively moveable between a forward position and a rearward position within a motor vehicle, the forward position including the vertically-oriented panel positioned between a driver's seat and a passenger entryway of the motor vehicle for intercepting projectiles travelling through the passenger entryway towards an occupant of the driver's seat and the rearward position including the vertically-oriented panel positioned essentially aft of the forward position,
an upper track engaged with a top of the vertically-oriented panel, and
wherein the forward section includes a front portion coupled to an underside of a destination display enclosure and a rearward portion detachably coupled between the front portion and the rearward section.

20. A method of protecting a bus driver comprising providing the barrier apparatus of claim 1 within a bus and sliding the vertically-oriented panel from the rearward position to the forward position without obstructing a passenger aisle extending between the driver's seat and the passenger entryway of the bus.

21. A barrier system for protecting a bus driver comprising:
a track system extending substantially fore and aft within a bus and between a seat in a driver's compartment portion and a passenger entryway of the bus,
a panel supported by the track system, the panel being movable between a forward position and a rearward position, and
two pivot axes about which the panel is adapted and arranged to pivot.

22. The barrier system according to claim 21 further comprising a passenger aisle located between the passenger entryway and the panel when the panel is in the forward position and the rearward position.

23. The barrier system according to claim 21 wherein, when in the forward position, the barrier does not intersect a line of sight extending through the passenger entryway and to and between a driver occupying the seat of the driver's compartment portion and a side view mirror extending outwardly from an exterior surface portion of the bus located on a passenger entryway side of the bus.

24. The barrier system according to claim 21 wherein the panel is slidably and pivotably engaged with the track system.

25. The barrier system according to claim 21 wherein the track system includes an upper track and a lower track between which the panel extends.

26. The barrier system according to claim 25 wherein the lower track is supported above an aisle floor of the bus.

27. The barrier system according to claim 25 wherein the lower track includes a rearward section and a forward section oriented at an angle relative to the rearward section and the upper track includes a rearward section and a forward section oriented at an angle relative to the rearward section of the upper track.

28. A barrier system for protecting a bus driver comprising:
a track system extending substantially fore and aft within a bus and between a driver's compartment portion and a passenger entryway of the bus, the track system including an upper track and a lower track between which the panel extends, and
a panel supported by the track system, the panel being movable between a forward position and a rearward position,
wherein the lower track includes a rearward section and a forward section oriented at an angle relative to the rearward section and the upper track includes a rearward section and a forward section oriented at an angle relative to the rearward section of the upper track and wherein the forward section of the upper track includes a front portion coupled to an underside of a destination display enclosure and a rearward portion detachably coupled between the front portion and the rearward section.

29. The barrier system according to claim 21 wherein, when moved between the forward position and the rearward position, the panel is slid along and simultaneously pivoted about the pivot axes within the track system.

30. A method of protecting a bus driver comprising providing the barrier system of claim 21 and moving the entire panel forward into the forward position from the rearward position.

31. A barrier system comprising:
an upper track and a lower track, and
a panel arranged between the upper track and the lower track,
wherein the panel is positioned between a bus driver's seat and a passenger entryway of the bus and slidable fore and aft within the bus and the upper track has a rear section and a forward section arranged at an angle to the rear section.

32. The barrier system according to claim 31 wherein the upper track is coupled to a structure located immediately behind the bus driver's seat.

33. The barrier system according to claim 31 wherein the lower track is coupled to a platform upon which the bus driver's seat is supported.

34. The barrier system according to claim 31 further comprising a trolley mechanism pivotably engaged to and between the upper track and the panel.

35. The barrier system according to claim 31 wherein the panel is located between the driver's seat and a passenger aisle of the bus.

36. The barrier according to claim 31 wherein the panel includes at least two pivot axes.

37. The barrier according to claim 36 wherein the at least two pivot axes extend vertically and are horizontally movable.

38. A method of protecting a bus driver comprising providing the barrier system of claim 31 and moving the panel forward along the upper track and the lower track.

39. The method according to claim 38 further comprising moving the panel rearward along the upper track and the lower track when it is desired to provide an exit for a driver from the bus.

40. The method according to claim 39 wherein the panel in its entirety is moved forward and rearward.

* * * * *